No. 891,639. PATENTED JUNE 23, 1908.
R. SCHÜTZ.
ROPE AND CABLE GRIP.
APPLICATION FILED MAR. 13, 1908.
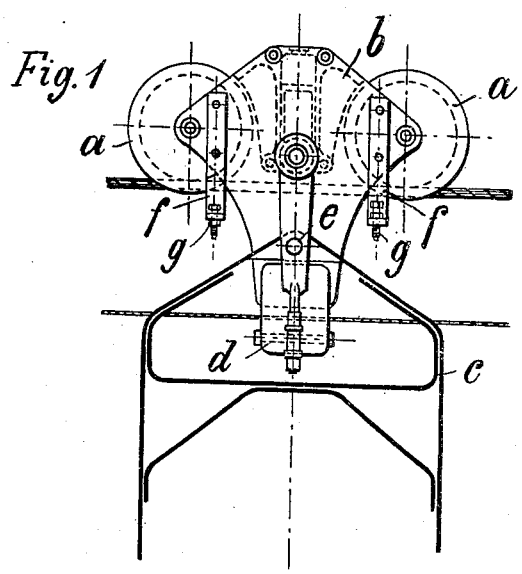
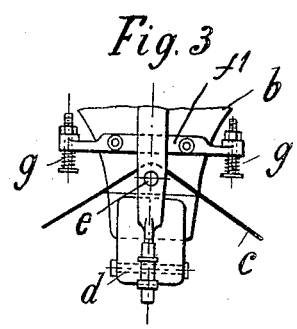
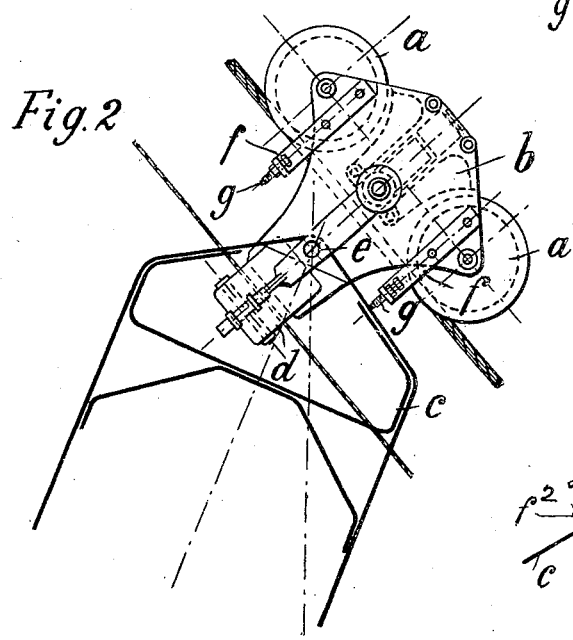
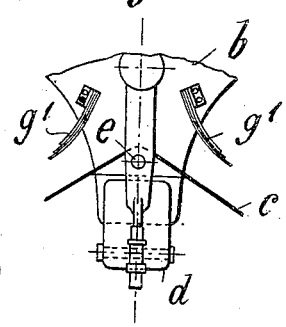
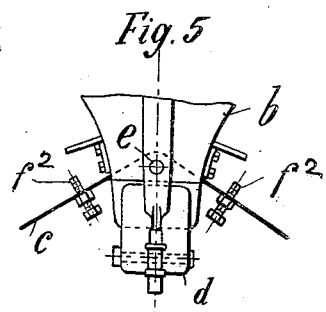

UNITED STATES PATENT OFFICE.

ROBERT SCHÜTZ, OF LEIPZIG EUTRITZSCH, GERMANY, ASSIGNOR TO ADOLF BLEICHERT & COMPANY, OF LEIPZIG-GOHLIS, GERMANY.

ROPE AND CABLE GRIP.

No. 891,639.  Specification of Letters Patent.  Patented June 23, 1908.

Application filed March 13, 1908. Serial No. 420,950.

*To all whom it may concern:*

Be it known that I, ROBERT SCHÜTZ, a subject of the King of Saxony, residing at Leipzig Eutritzsch, Germany, have invented a certain new and useful Improvement in Rope and Cable Grips, of which the following is a specification.

Ordinary rope and cable grips for haulage purposes, operated by the weight of the load which is being hauled, have the disadvantage that when the trolley is traveling on a steep gradient the action of the hauling rope causes the front and rear trolley wheels to be unequally loaded, and the gripping action is reduced by the inclined position of the trolley relatively to the load, since in this position only a component of the weight acts on the grip-actuating mechanism, and the hauling rope is therefore not gripped with the same amount of force as when the trolley is traveling on a horizontal track.

The present invention consists in obtaining increased gripping action on gradients, with uniform load on the trolley wheels, by arranging abutments on the trolley or hanger, so placed that the swaying of the hanger relatively to the trolley is limited, so that the tendency of the hanger, on steep gradients, to sway beyond the limit fixed, causes the gripping action to be increased proportionally to the steepness of the gradient. This arrangement allows of working on gradients far exceeding 45 degrees, with the same security as when working on a horizontal track. At the same time the load on the wheels is kept practically uniform, since the inclined hanger throws additional load on the trolley wheel which is relieved by the action of the hauling rope.

A construction embodying the invention is shown in the annexed drawing, which represents a grip coupling the trolley to a hauling rope below the rail-rope or cable.

Figure 1 illustrates one form of the trolley in side elevation suspended from a horizontal rope. Fig. 2 shows the same trolley suspended from an inclined rope. Figs. 3, 4 and 5 show modified constructions of abutments.

The two wheels $a$ are connected to each other by a frame $b$, from which is suspended the hanger $c$ which carries the load, the hanger being rotatable about a pivot $e$ located above the grip $d$.

Two bars $f$ are fixed to the frame, above the hanger, and abutments such as screws $g$ are adjustable in lugs at the lower ends of said bars, so that the abutments can be adjusted according to the steepness of the gradient at which they are to come into action. Instead of screws, adjustable springs or the like may be used as abutments. The adjustment of the abutments for any particular gradient depends on the distance of the center of gravity of the load from the hauling rope and cable.

When the trolley is traveling on a steep gradient the suspended hanger bears against the abutment $g$ adjacent the lower wheel $a$, and since the abutment limits the extent to which the hanger can rotate about the pivot $e$, the hanger assumes an inclined position. By this means the force with which the grip engages the hauling rope is increased, owing to the movement of the load about the fulcrum formed by the abutment.

The construction illustrated may be modified in various ways. Instead of having a separate vertical abutment-bar $f$ at each end of the trolley-frame, a single normally horizontal bar $f^1$ may be used, with abutments at its ends as in Fig. 3, or abutment-springs $g^1$ may be directly connected to the frame as in Fig. 4. Instead of arranging the abutments on the frame they may be arranged on the hanger $c$ as at $f^2$ Fig. 5. With suitable modifications the device may be applied to a grip engaging a hauling rope above the cable, or to a combination of trolleys.

What I claim as my invention and desire to secure by Letters Patent of the United States is:—

The combination of a trolley, a hanger, a rope or cable grip actuated by the weight of a load suspended from the trolley by means of the hanger, and abutments located with reference to said trolley and hanger to limit the swaying of the hanger relatively to the trolley, when the latter is inclined beyond a predetermined amount, for the purpose set forth.

In witness whereof I have signed this specification in the presence of two witnesses.

ROBERT SCHÜTZ.

Witnesses:
 FRITZ V. KELLER,
 RUDOLF PFAFFENBACH